(12) United States Patent
Tiwari et al.

(10) Patent No.: US 10,481,018 B2
(45) Date of Patent: Nov. 19, 2019

(54) EVALUATING PERFORMANCE OF A FLUID TRANSPORT SYSTEM USING LIMITED SENSOR DATA

(71) Applicant: General Electric Company, Schenectady, NY (US)

(72) Inventors: Awadesh Kumar Tiwari, Bangalore (IN); Arul Saravanapriyan, Atlanta, GA (US); Gunaranjan Chaudhry, Bangalore (IN); Nimmy Paulose, Bangalore (IN)

(73) Assignee: General Electric Company, Schenectady, NY (US)

( * ) Notice: Subject to any disclaimer, the term of this patent is extended or adjusted under 35 U.S.C. 154(b) by 723 days.

(21) Appl. No.: 15/132,734

(22) Filed: Apr. 19, 2016

(65) Prior Publication Data

US 2017/0299531 A1   Oct. 19, 2017

(51) Int. Cl.
*G01K 17/10* (2006.01)
*G01K 13/02* (2006.01)

(52) U.S. Cl.
CPC ............. *G01K 17/10* (2013.01); *G01K 13/02* (2013.01)

(58) Field of Classification Search
None
See application file for complete search history.

(56) References Cited

U.S. PATENT DOCUMENTS

| | | | |
|---|---|---|---|
| 5,992,505 A | 11/1999 | Moon | |
| 7,455,099 B2 | 11/2008 | Osborn et al. | |
| 8,672,537 B2 | 3/2014 | Veau et al. | |
| 2005/0034467 A1* | 2/2005 | Varney | G05B 13/024 62/178 |
| 2008/0021675 A1* | 1/2008 | Fehr | G06Q 10/04 702/182 |
| 2008/0082304 A1* | 4/2008 | Miller | G05B 17/02 703/9 |

(Continued)

FOREIGN PATENT DOCUMENTS

EP   2115608 B1   11/2009

OTHER PUBLICATIONS

Tyree et al. A Monte Carlo Evaluation of the Moving Method, K-means, and Two self-organising neural networks, Pattern Analysis & Applications, 79-90, Springer-Verlag, London Limted (Year: 1998).*

*Primary Examiner* — Roy Y Yi
(74) *Attorney, Agent, or Firm* — Eversheds Sutherland (US) LLP

(57) ABSTRACT

Embodiments of the disclosure relate to systems and methods to evaluate performance of a fluid transport system. Towards this end, a performance report of the fluid transport system can be generated by estimating various performance parameters at an outlet of a heat exchanger in lieu of using sensor data obtained directly from the outlet of the heat exchanger. Specifically, in one exemplary implementation, sensor data is obtained from an inlet of the heat exchanger and an outlet of a downstream element that is coupled to the heat exchanger, for estimating the various performance parameters at the outlet of the heat exchanger. The estimated performance parameters can then be combined with empirical data and predictive data for generating the performance report of the fluid transport system.

29 Claims, 5 Drawing Sheets

(56) References Cited

U.S. PATENT DOCUMENTS

| | | | |
|---|---|---|---|
| 2010/0088075 A1* | 4/2010 | Yin | B01J 19/0033 703/2 |
| 2011/0272117 A1* | 11/2011 | Hamstra | F24D 12/02 165/45 |
| 2012/0089346 A1* | 4/2012 | Huyse | G06Q 10/06 702/34 |
| 2012/0103011 A1* | 5/2012 | Chantant | F25J 1/0022 62/613 |

* cited by examiner

EVALUATING PERFORMANCE OF A FLUID TRANSPORT SYSTEM USING LIMITED SENSOR DATA

FIELD OF THE DISCLOSURE

This disclosure relates to evaluating performance of a fluid transport system using limited sensor data.

BACKGROUND OF THE DISCLOSURE

Heat exchangers are typically used for dissipating heat in various fluid transport applications such as in a pipeline that transports a hot fluid or a hot gas. Such pipelines are commonly used, for example, in liquid natural gas (LNG) transport systems that are complex in structure and can extend over a large area. The operational status of the heat exchangers as well as other elements of a fluid transport system can be monitored using a variety of sensors to ensure satisfactory system performance. However, in some cases, a sensor may be absent, unavailable, or malfunctioning, thereby preventing, or handicapping an adequate performance evaluation of the fluid transport system. Understandably, an incomplete or inaccurate performance evaluation can result in various types of cost penalties to various parties.

BRIEF DESCRIPTION OF THE DISCLOSURE

Certain embodiments of the disclosure can provide a technical effect and/or solution to evaluate performance of a fluid transport system. Towards this end, a performance report of the fluid transport system can be generated by estimating various performance parameters at an outlet of a heat exchanger in lieu of using sensor data obtained directly from the outlet of the heat exchanger. Specifically, in one exemplary implementation, sensor data is obtained from an inlet of the heat exchanger and an outlet of a downstream element that is coupled to the heat exchanger, for estimating the various performance parameters at the outlet of the heat exchanger. The estimated performance parameters can be combined with empirical data and predictive data for generating the performance report of the fluid transport system.

According to one exemplary embodiment of the disclosure, a method includes receiving by a processor(s), sensor data from an inlet of a first heat exchanger and an outlet of a downstream element coupled to the first heat exchanger; empirical data associated with one or both of the first heat exchanger and the downstream element; and predictive data associated with one or both of the first heat exchanger and the downstream element. The processor(s) can execute an evaluation procedure by using at least the sensor data, the empirical data and the predictive data in order to generate a performance report.

According to another exemplary embodiment of the disclosure, a system includes a memory containing computer-executable instructions and a processor. The processor is configured to access the memory and execute computer-executable instructions to at least receive sensor data from an inlet of a first heat exchanger and an outlet of a downstream element coupled to the first heat exchanger, receive empirical data associated with one or both of the first heat exchanger and the downstream element, and receive predictive data associated with one or both of the first heat exchanger and the downstream element. A performance report can be generated by the processor by executing an evaluation procedure using at least the sensor data, the empirical data, and the predictive data.

According to another exemplary embodiment of the disclosure, a system includes a first heat exchanger having an outlet coupled to an inlet of a downstream element in a coupling arrangement that is characterized at least in part by an absence of sensor data indicative of a health status of the coupling arrangement. The system further includes a heat exchanger performance evaluation system having a processor, the processor configured to generate a performance report associated with at least one of the first heat exchanger or the downstream element by executing an evaluation procedure based on receiving sensor data from an inlet of the first heat exchanger and an outlet of the downstream element, receiving empirical data associated with one or both of the first heat exchanger and the downstream element, receiving predictive data associated with the one or both of the first heat exchanger and the downstream element, and generating the performance report by using at least the sensor data, the empirical data and the predictive data.

According to yet another exemplary embodiment of the disclosure, a method includes receiving, by one or more processors, sensor data from an inlet of a first heat exchanger and an outlet of a downstream element coupled to the first heat exchanger; receiving empirical data associated with one or both of the first heat exchanger and the downstream element; and receiving predictive data associated with one or both of the first heat exchanger and the downstream element. The one or more processors can generate a command signal by executing an evaluation procedure using at least the sensor data, the empirical data, and the predictive data; and output the command signal to a controller. The controller can generate one or more control signals based at least in part on the command signal and output at least one control signal to one or both of the first heat exchanger and the downstream element to modify an operating state of the first heat exchanger and/or the downstream element. The one or more processors can evaluate the modified operating state of the first heat exchanger and/or the downstream element to determine an extent of change in one or more parameters of the first heat exchanger and/or the downstream element.

Other embodiments and aspects of the disclosure will become apparent from the following description taken in conjunction with the following drawings.

BRIEF DESCRIPTION OF THE DRAWINGS

Figure 1:
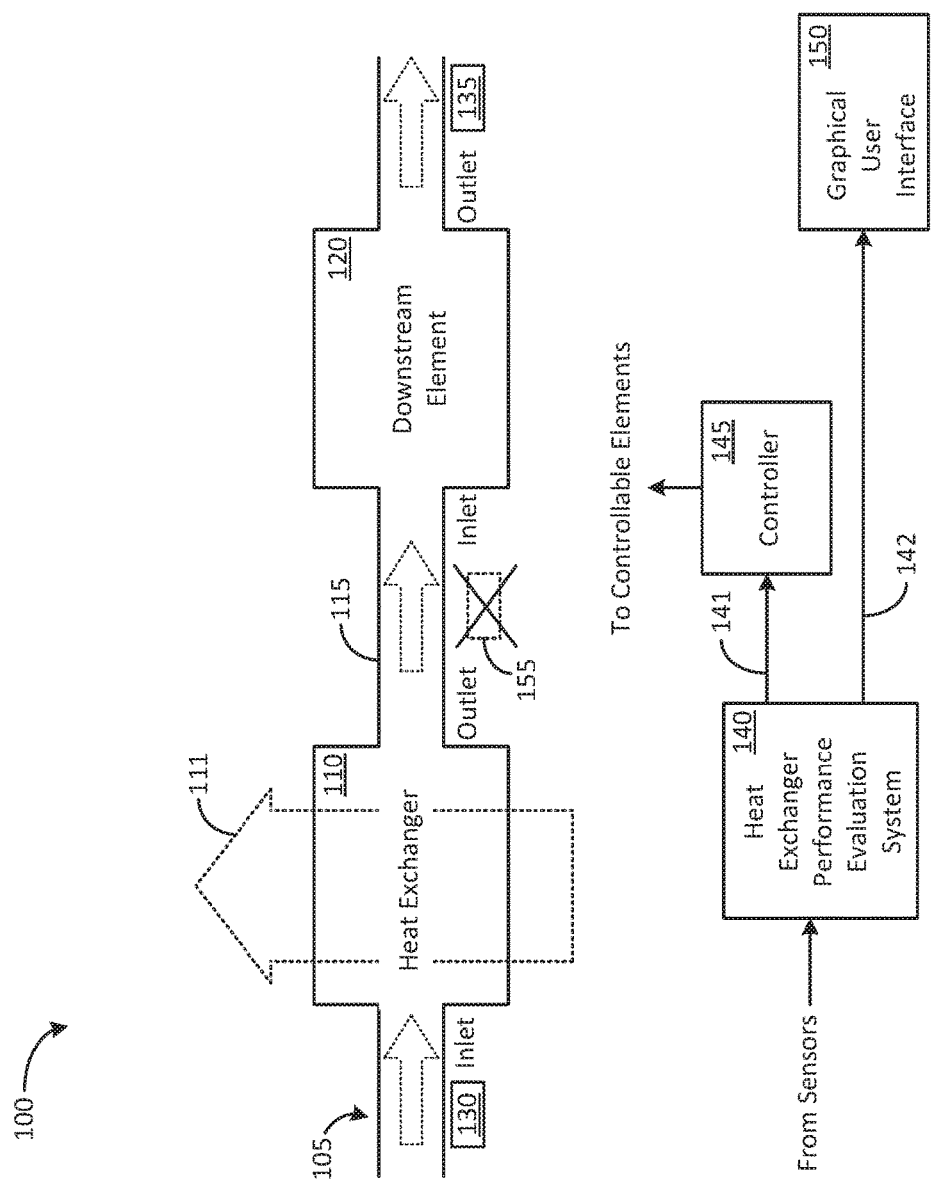

Having thus described the disclosure in general terms, reference will now be made to the accompanying drawings, which are not necessarily drawn to scale, and wherein:

FIG. 1 illustrates an example fluid transport system incorporating a heat exchanger performance evaluation system in accordance with an embodiment of the disclosure.

Figure 2:
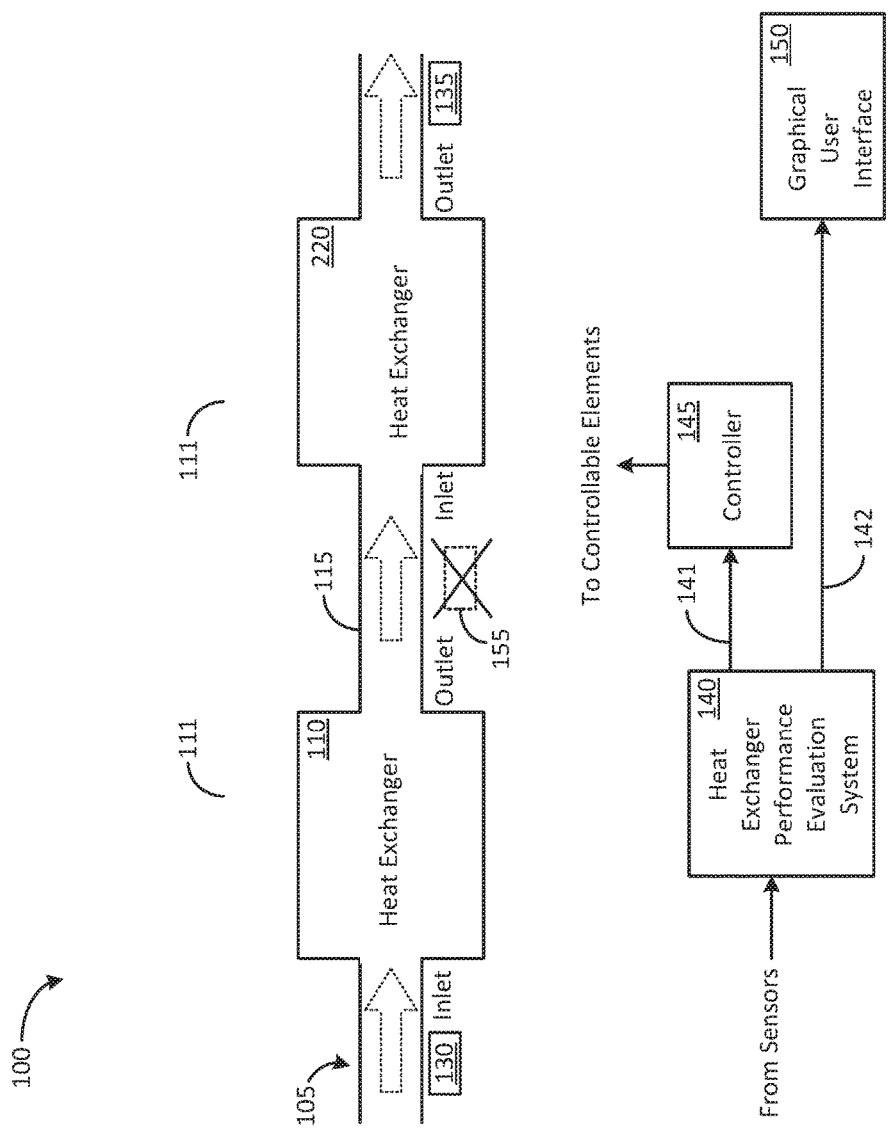

FIG. 2 illustrates an example implementation of the fluid transport system shown in FIG. 1.

Figure 3:
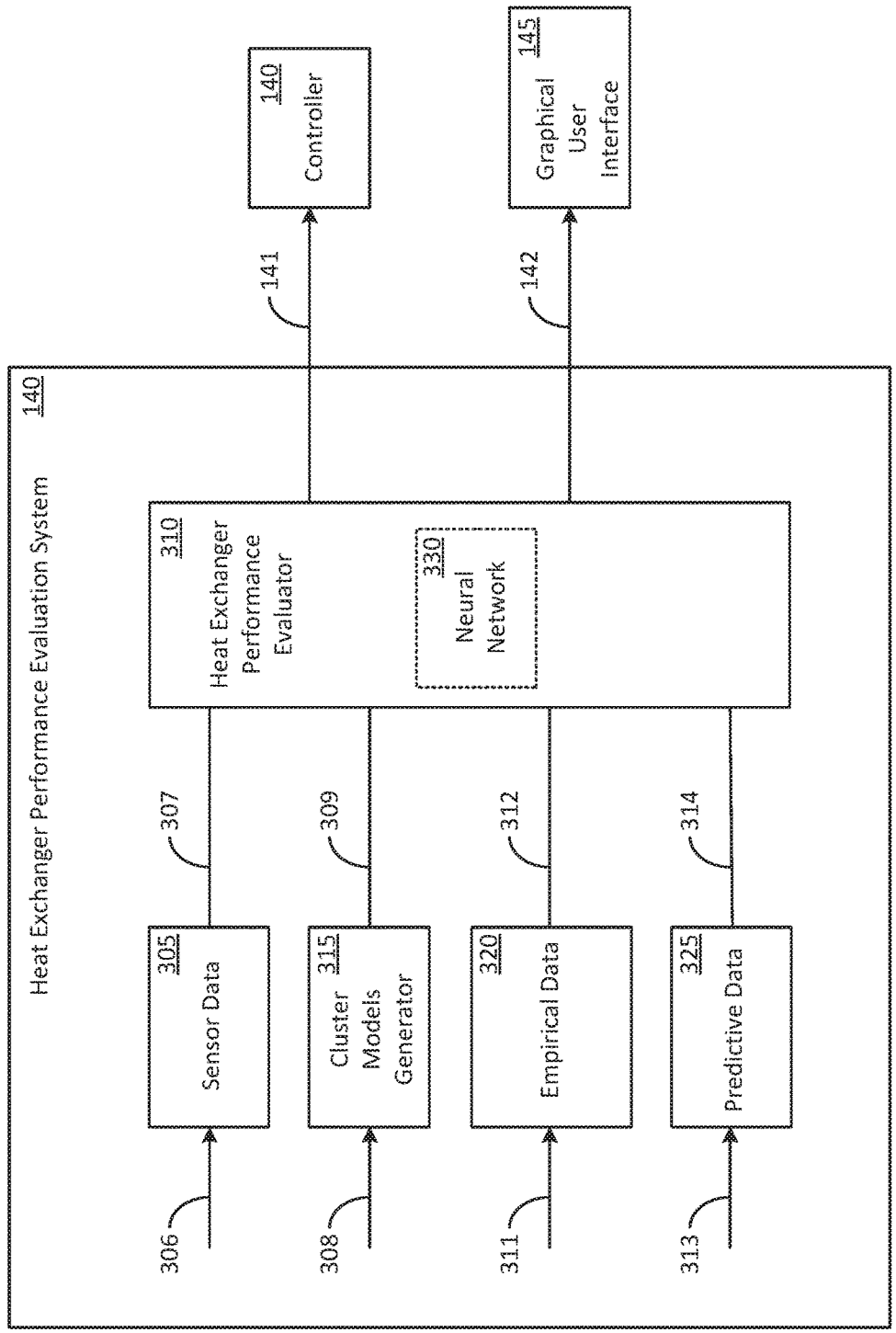

FIG. 3 illustrates some exemplary components of a heat exchanger performance evaluation system in accordance with an embodiment of the disclosure.

Figure 4:
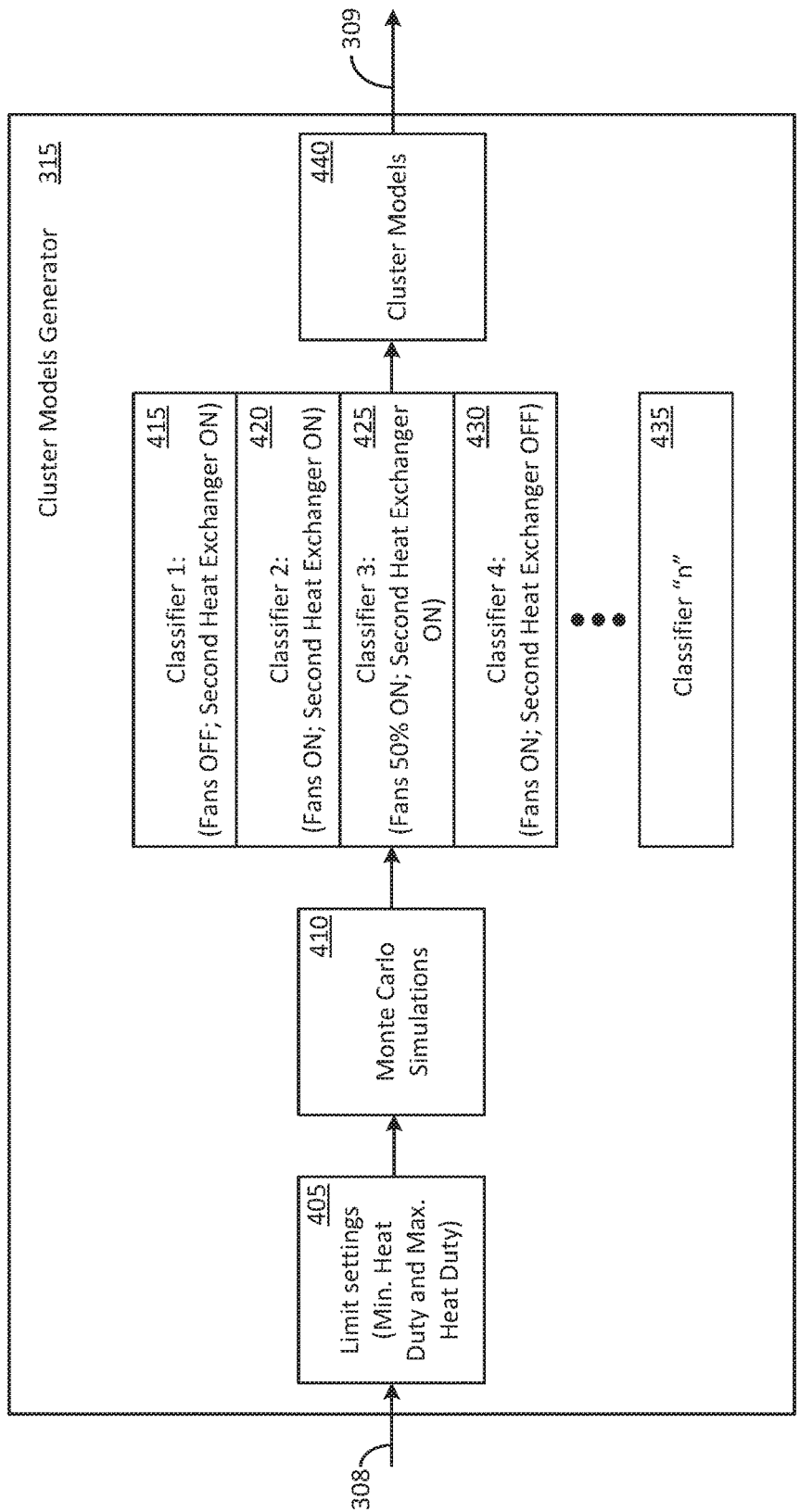

FIG. 4 illustrates some exemplary components of a cluster models generator that can be a part of the exemplary heat exchanger performance evaluation system shown in FIG. 3.

Figure 5:
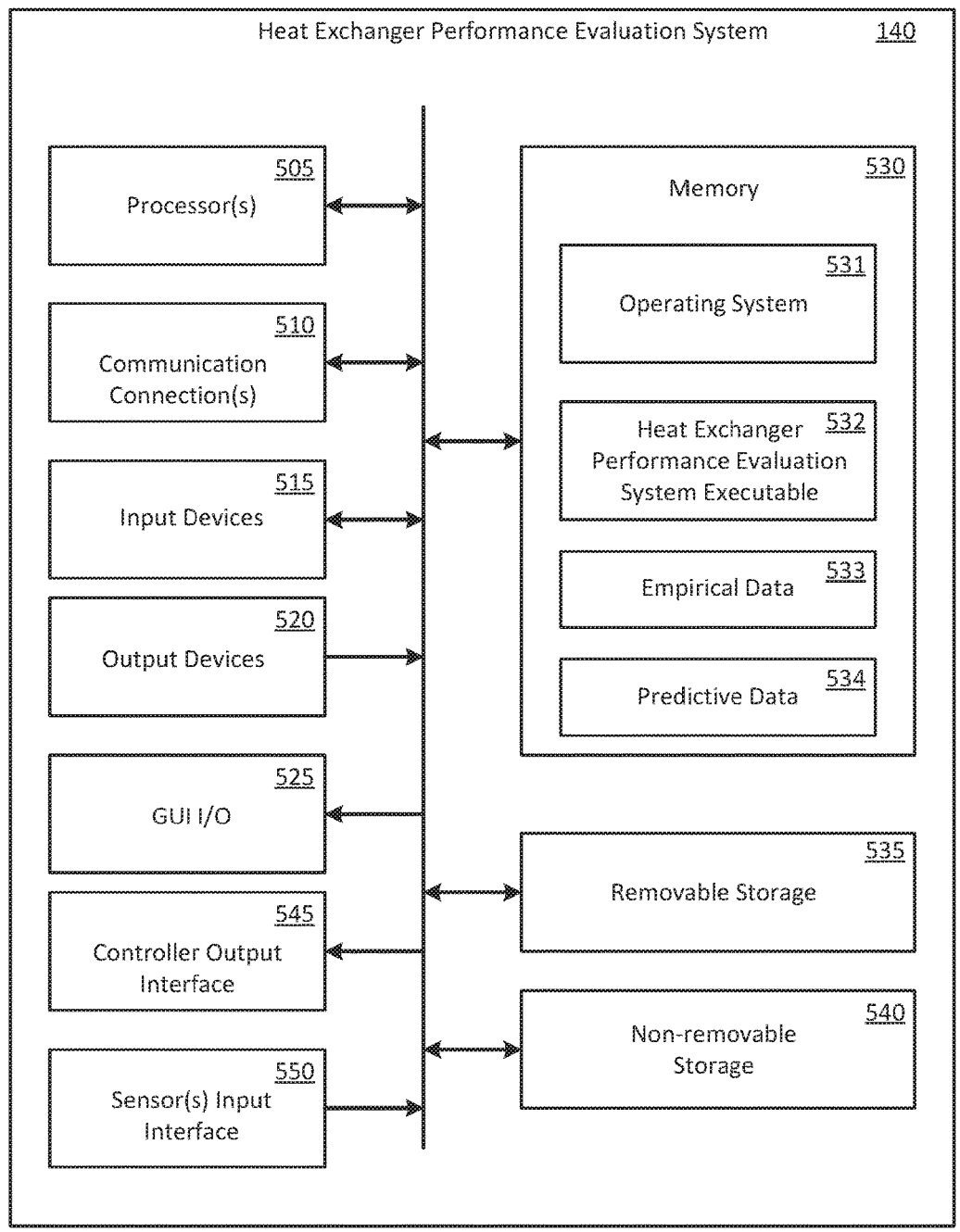

FIG. 5 illustrates an example heat exchanger performance evaluation system in accordance with another embodiment of the disclosure.

DETAILED DESCRIPTION OF THE DISCLOSURE

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein; rather, these embodiments are provided so that this disclosure will satisfy applicable legal requirements. Like numbers refer to like elements throughout. It should be understood that certain words and terms are used herein solely for convenience and such words and terms should be interpreted as referring to various objects and actions that are generally understood in various forms and equivalencies by persons of ordinary skill in the art. For example, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

Attention is first drawn to FIG. 1, which illustrates an example fluid transport system 100 incorporating a heat exchanger performance evaluation system 140 in accordance with an exemplary embodiment of the disclosure. In this exemplary embodiment, the fluid transport system 100 includes a heat exchanger 110 that can be used to dissipate heat from a fluid flowing through a pipeline 105. The heat can be dissipated by using airflow as indicated by the dashed arrow 111. A downstream direction of the fluid flow is also indicated by the various dashed arrows shown inside the pipeline 105. After passing out of an outlet of the heat exchanger 110, the fluid flows through a pipeline coupling portion 115 and enters a downstream element 120 via an inlet of the downstream element 120. The downstream element 120 can be any one of various diverse elements such as a pump, a valve, a drum, a flow controller, a flow diverter, or another heat exchanger. The fluid exits the downstream element 120 via an outlet and continues flowing in the downstream direction in some cases. In other cases, the fluid flow may be terminated in another downstream element (not shown), such as a storage tank.

Several sensors can be installed at various locations in the fluid transport system 100 for monitoring various parameters such as fluid temperature, flow rate, fluid pressure, and/or viscosity. The sensors can accordingly be one or more of a temperature sensor, a flow rate sensor, a pressure sensor, or a viscosity sensor, for example. The nature of these various sensors and the location of these various sensors are typically determined at the time of installation of the fluid transport system 100, often on the basis of past expertise and/or system requirements. As can be appreciated, it can be discovered later on that one or more sensors have not been installed at certain desired locations for monitoring certain desired parameters. In some cases such missing sensors can be retrofitted into the fluid transport system 100. However, in some other cases, retrofitting may not be feasible due to various factors such as cost, convenience, and accessibility. Furthermore, even when the various sensors have been adequately designed and installed in the fluid transport system 100, one or more sensors can fail due to various reasons and it may be impractical or infeasible to either repair or replace the failed sensors. Nonetheless, the information derived from these failed sensors may still be needed for effectively monitoring the performance of the fluid transport system 100. It is therefore desirable to provide a solution that addresses missing or failed sensors in the fluid transport system 100.

Towards this end, attention is drawn to a sensor 130 located at the inlet of the heat exchanger 110. The sensor 130 can be one of various types of sensors as described above and can be used to obtain data associated with one or more parameters (temperature, flow rate, fluid pressure, and/or viscosity, for example) at the inlet of the heat exchanger 110. Another sensor 135 is located at an outlet of the downstream element 120. The sensor 135 can be similar to, or different than, the sensor 130, can be used to obtain data associated with one or more parameters at the outlet of the downstream element 120. The one or more parameters monitored at the outlet of the downstream element 120 can be similar to, or different than, the one or more parameters monitored at the inlet of the heat exchanger 110. For example, a flow rate parameter can be measured at the inlet of the heat exchanger 110 while fluid temperature may be measured at outlet of the downstream element 120 for correlating flow rate with temperature.

Attention is next drawn to yet another sensor 155 that is shown in a dashed line format to indicate that the sensor 155 is either missing or has failed. In either case, it may be discovered that it is desirable to obtain sensor data associated with a coupling element 115 located between the heat exchanger 110 and the downstream element 120. The coupling element 115 can be, for example, a pipeline segment, a coupler, a welded joint, or a secondary element (a cooling fin, a shut-off valve etc.). However, such sensor data is unavailable because the sensor 155 is either missing or has failed. Consequently, in accordance with various embodiments of the disclosure, the sensor data obtained from the inlet of the heat exchanger 110 (via the sensor 130) and the sensor data obtained from the outlet of the downstream element 120 (via the sensor 135) can be processed in combination with some other types of data (described below) by the heat exchanger performance evaluation system 140 in order to generate a comprehensive performance report regardless of the unavailability of the sensor 155.

The heat exchanger performance evaluation system 140 is communicatively coupled to the sensor 130, the sensor 135, and to other parts of the fluid transport system 100, for acquiring sensor data and/or other kinds of data that can be used for generating the performance report and/or for generating one or more outputs that can be used for various purposes. A first such output, in the form of a command signal, can be provided to a controller 145, via a communications link 141. The controller 145 can use the command signal to generate one or more control signals that can be provided to one or more elements of the fluid transport system 100. For example, the controller 145 can transmit a control signal to the heat exchanger 110 to modify an operation of the heat exchanger 110, such as changing an air flow, changing a fluid flow rate, or operating a valve. The results of modifying an operation of the heat exchanger 110 can be then be evaluated by the heat exchanger performance evaluation system 140 to determine an extent of change in one or more parameters of the fluid transport system 100. This procedure can be a recursive procedure until a desired operating state of the fluid transport system 100 is achieved.

Another output of the heat exchanger performance evaluation system 140 can be provided in the form of a display signal that is coupled into a graphical user interface (GUI) 150. The display signal can be used by the GUI 150 for displaying various types of status messages, warning messages, and/or alarm messages associated with the fluid transport system 100. An operator can review a message displayed on the GUI 150 and execute suitable actions. For example, when the displayed message is a warning message the operator can respond by performing maintenance work or pre-emptive remedial action upon one or more components of the fluid transport system 100.

FIG. 2 illustrates an exemplary implementation of the fluid transport system 100 according to an embodiment of the disclosure. In this particular exemplary implementation, the downstream element 120 shown in FIG. 1 is a second heat exchanger 220 that is coupled to the heat exchanger 110. Here again, the sensor 155 is shown in a dashed line format to indicate that the sensor 155 is missing or has failed. In some applications, the heat exchanger 220 can be similar or identical to the heat exchanger 110, and different, in some other applications. When different, the heat exchanger 220 can be a shell-and-tube heat exchanger and the heat exchanger 110 can be an air-cooled finned-tube heat exchanger, for example.

FIG. 3 illustrates some exemplary components of the heat exchanger performance evaluation system 140 in accordance with an exemplary embodiment of the disclosure. The exemplary components are shown in the form of functional blocks that can be implemented in various ways, such as in the form of hardware (a memory, a data storage buffer, etc.), software (an executable program, for example), firmware, or in various combinations thereof.

Sensor data 305 reflects sensor data obtained from various sensors, particularly, from the sensor 130 located at the inlet of the heat exchanger 110 and the sensor 135 located at the outlet of the downstream element 120. It must be understood that the sensor data 305 explicitly precludes sensor data from the sensor 155 that is either missing or has failed. The sensor data 305 is provided via a communications link 307 to a heat exchanger performance evaluator 310 that can process the sensor data 305 along with other data as described below in more detail.

Such other data can be provided, for example, by a cluster models generator 315 that generates cluster models based on various types of data that can be provided via a communications link 308. Such data can include, for example, historical sensor data and/or data in the form of various specified input limits. The various specified limits can include, for example, a minimum heat duty and maximum heat duty that correspond to a minimum load and a maximum load imposed upon an element such as the heat exchanger 110 or the heat exchanger 220. Further details pertaining to the cluster models generator 315 are provided below using FIG. 4. The cluster models generated by the cluster models generator 315 is provided via a communications link 309 to a heat exchanger performance evaluator 310

Empirical data 320 can be, for example, statistical data and/or historical data pertaining to various parameters associated with various components of the fluid transport system 100. Such parameters can include, for example, temperature, pressure, pressure difference, vibration, and/or flow rate. Empirical data 320 can also be derived by using one or more membership functions such as a thermal input to thermal output ratio, and/or by using historic heat duty information. The empirical data 320 is provided via a communications link 312 to the heat exchanger performance evaluator 310. Predictive data 325 can be for example, data derived from statistical representations, theoretical representations, and/or estimates associated with various components of the fluid transport system 100. The predictive data 325 is provided via a communications link 314 to the heat exchanger performance evaluator 310.

The heat exchanger performance evaluator 310 can include a neural network 330 that is used for processing the various types of data provided to the heat exchanger performance evaluator 310. The neural network 330 can be executed in the form of an algorithm that is used to determine various parameters (temperature, pressure, etc.) associated with pipeline coupling portion 115 in spite of lacking data from the sensor 155 that is missing or has failed. The various parameters, which can be determined by various techniques such as estimation and extrapolation, can not only be used to generate performance data in a graphical format for display on the GUI 150 but can also be used to determine various other characteristics of the fluid transport system 100, such as fouling, heat transfer capacity, and degradation, for example.

FIG. 4 illustrates some exemplary components of the cluster models generator 315 shown in FIG. 3 according to an embodiment of the disclosure. In this example embodiment, various specified limits, such as minimum heat duty and maximum heat duty, provided via the communications link 308, are indicated in the form of a limits setting 405. One or more Monte Carlo simulations 410 can be run on the limits setting 405 to obtain a set of "n" classifiers (n≥2). Four example classifiers among the "n" classifiers are shown in order to describe exemplary details of such classifiers. The four example classifiers are based on a combination of a first functional operating characteristic of a first element such as the heat exchanger 110, and a second functional operating characteristic of a second element such as the heat exchanger 120.

Specifically, Classifier 1 415 can be characterized by a "Fans OFF" condition in combination with a "Second Heat Exchanger ON" condition. Classifier 2 420 can be characterized by a "Fans ON" condition in combination with a "Second Heat Exchanger ON" condition. Classifier 3 425 can be characterized by a "Fans 50% ON" condition in combination with a "Second Heat Exchanger ON" condition. Classifier 4 430 can be characterized by a "Fans ON" condition in combination with a "Second Heat Exchanger OFF" condition. Additional classifiers (not shown) may be based on other functional operating characteristics of various components of the fluid transport system 100 including, for example, a condition such as "Fans 25% ON". Cluster models 415 can be generated based on these "n" classifiers, and provided to the heat exchanger performance evaluator 310 via the communication link 309.

FIG. 5 illustrates a heat exchanger performance evaluation system 140 in accordance with another exemplary embodiment of the disclosure. In this exemplary embodiment, the heat exchanger performance evaluation system 140 is embodied in a computer system incorporating a processor 505 that executes computer-executable instructions stored in a memory 530. The processor 505 can be implemented and operated using appropriate hardware, software, firmware, or combinations thereof. Software or firmware implementations can include computer-executable or machine-executable instructions written in any suitable programming language to perform the various functions described. In one embodiment, instructions associated with a function block language can be stored in the memory 530 and executed by the processor 505.

The memory 530 can be used to store program instructions that are loadable and executable by the processor 505, as well as to store data generated during the execution of these programs. Depending on the configuration and type of the computer used, the memory 530 can be volatile (such as random access memory (RAM)) and/or non-volatile (such as read-only memory (ROM), flash memory, etc.). In some embodiments, the memory devices can also include additional removable storage 535 and/or non-removable storage 540 including, but not limited to, magnetic storage, optical disks, and/or tape storage. The disk drives and their associated computer-readable media can provide non-volatile storage of computer-readable instructions, data structures, program modules, and other data for the devices. In some implementations, the memory 530 can include multiple different types of memory, such as static random access memory (SRAM), dynamic random access memory (DRAM), or ROM.

The memory 530, the removable storage 535, and the non-removable storage 540 are all examples of non-transitory computer-readable storage media. For example, non-transitory computer-readable storage media can include volatile and non-volatile, removable and non-removable media implemented in any method or technology for storage of information such as computer-readable instructions, data structures, program modules or other data. Additional types of non-transitory computer storage media that can be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

Heat exchanger performance evaluation system 140 can also include one or more communication connections 510 that can allow a control device (not shown) to communicate with devices or equipment capable of communicating with the heat exchanger performance evaluation system 140. The connections can be established via various data communication channels or ports, such as USB or COM ports to receive cables connecting the control device to various other devices on a network. In one embodiment, the control device can include Ethernet drivers that enable the control device to communicate with other devices on the network. According to various embodiments, communication connections 510 can be established via a wired and/or wireless connection on the network.

The heat exchanger performance evaluation system 140 can also include one or more input devices 515 such as a keyboard, mouse, pen, voice input device, and touch input device, and one or more output devices 520 such as a display, printer, and speakers. The heat exchanger performance evaluation system 140 can further include a GUI I/O 525, a controller output interface 545, and a sensor(s) input interface 550. The GUI I/O 525 can be used to allow an operator to provide input information from the GUI 150 (shown in FIG. 1) to the heat exchanger performance evaluation system 140, and to provide output information from the heat exchanger performance evaluation system 140 to the GUI 150. The controller output interface 545 can be used to provide a health status to the controller 145 (shown in FIG. 1). The sensor(s) input interface 550 can be used to obtain operational data from the sensor 130 and the sensor 135, for example.

Turning to the contents of the memory 530, the memory 530 can include, but is not limited to, an operating system (OS) 531 and one or more application programs or services for implementing the features and aspects disclosed herein. Such applications or services can include a heat exchanger performance evaluation system executable 532, empirical data 533, and predictive data 534, each of which can be implemented in the form of software that is accessible to the processor 505. When executed by the processor 505, the heat exchanger performance evaluation system executable 532 can be used in conjunction with the empirical data 533 and/or the predictive data 534 to implement the various functionalities and features described in this disclosure.

References are made herein to block diagrams of systems, methods, and computer program products according to example embodiments of the disclosure. It will be understood that at least some of the blocks of the block diagrams, and combinations of blocks in the block diagrams, respectively, can be implemented at least partially by computer program instructions. These computer program instructions can be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions can also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions can also be loaded onto a computer or other programmable data processing apparatus to cause a series of operational elements to be performed on the computer or other programmable apparatus to produce a computer implemented process such that the instructions that execute on the computer or other programmable apparatus provide elements for implementing the functions specified in the block or blocks.

One or more components of the systems and one or more elements of the methods described herein can be implemented through an application program running on an operating system of a computer. They also can be practiced with other computer system configurations, including handheld devices, multiprocessor systems, microprocessor based, or programmable consumer electronics, mini-computers, mainframe computers, etc.

Application programs that are components of the systems and methods described herein can include routines, programs, components, data structures, etc. that implement certain abstract data types and perform certain tasks or actions. In a distributed computing environment, the application program (in whole or in part) can be located in local memory, or in other storage. In addition, or in the alternative, the application program (in whole or in part) can be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the exemplary embodiments described above. Therefore, it is to be understood that the disclosure is not to be limited to the specific embodiments disclosed and that modifications and other embodiments are intended to be included within the scope of the appended claims.

That which is claimed is:

1. A method comprising:
   receiving, by one or more processors, sensor data from an inlet of a first heat exchanger in a gas turbine system, and further, receiving sensor data from an outlet of a downstream element coupled to the first heat exchanger;
   receiving, by the one or more processors, empirical data associated with one or both of the first heat exchanger and the downstream element;
   receiving, by the one or more processors, predictive data associated with one or both of the first heat exchanger and the downstream element; and
   generating, by the one or more processors, a command signal by executing an evaluation procedure using at least the sensor data, the empirical data, and the predictive data; and
   modifying, based at least in part on the command signal, operation of the first heat exchanger or the downstream element.

2. The method of claim 1, wherein the downstream element is one of a heat dissipating element or a heat transfer element, and wherein executing the evaluation procedure comprises using the sensor data obtained from the inlet of the first heat exchanger and the outlet of the one of a heat dissipating element or a heat transfer element to indirectly determine one or more performance parameters at the outlet of the first heat exchanger.

3. The method of claim 2, wherein the evaluation procedure comprises executing a neural network procedure, and wherein the sensor data obtained from the inlet of the first heat exchanger comprises at least one of thermal performance data or fluid-flow performance data.

4. The method of claim 3, wherein the fluid-flow performance data comprises at least one of fluid-flow pressure or fluid-flow rate.

5. The method of claim 1, wherein the downstream element is one of a second heat exchanger, a valve, a pump, or a drum, and wherein the empirical data associated with the one or both of the first heat exchanger and the one of a second heat exchanger, a valve, a pump, or a drum comprises a membership function that is defined on the basis of an input-output thermal transfer relationship.

6. The method of claim 5, further comprising:
   setting a limit value that is defined based at least in part on a minimum heat duty and a maximum heat duty of the at least one of the first heat exchanger or the one of a second heat exchanger, a valve, a pump, or a drum; and
   using the limit value in a Monte Carlo simulation procedure to define a plurality of classifiers.

7. The method of claim 6, wherein each of the plurality of classifiers is characterized by a unique combination of an operating condition of a fan that is a part of the first heat exchanger and an operating condition of the one of a second heat exchanger, a valve, a pump, or a drum.

8. The method of claim 7, further comprising:
   generating a plurality of cluster models based at least in part on the plurality of classifiers.

9. The method of claim 8, wherein executing the evaluation procedure comprises using the plurality of cluster models, the sensor data, the empirical data, and the predictive data to generate the performance report.

10. A system comprising:
    a memory containing computer-executable instructions; and
    a processor configured to access the memory and execute computer-executable instructions to at least:
       receive sensor data from an inlet of a first heat exchanger in a gas turbine system, and further, receive sensor data from an outlet of a downstream element coupled to the first heat exchanger;
       receive empirical data associated with one or both of the first heat exchanger and the downstream element;
       receive predictive data associated with one or both of the first heat exchanger and the downstream element; and
       generate a command signal by executing an evaluation procedure using at least the sensor data, the empirical data, and the predictive data; and
       modify, based at least in part on the command signal, operation of the first heat exchanger or the downstream element.

11. The system of claim 10, wherein the downstream element is one of a heat dissipating element or a heat transfer element, and wherein executing the evaluation procedure comprises using the sensor data obtained from the inlet of the first heat exchanger and the outlet of the one of a heat dissipating element or a heat transfer element to indirectly determine one or more performance parameters at the outlet of the first heat exchanger.

12. The system of claim 11, wherein the evaluation procedure executed by the processor is a neural network procedure and wherein generating the performance report further includes:
    generating a plurality of cluster models based at least in part on a plurality of classifiers; and
    executing the neural network procedure using the plurality of cluster models, the sensor data, the empirical data, and the predictive data.

13. The system of claim 12, wherein the downstream element is one of a second heat exchanger, a valve, a pump, or a drum and wherein each of the plurality of classifiers is characterized by a unique combination of an operating condition of a fan that is a part of the first heat exchanger and an operating condition of the one of a second heat exchanger, a valve, a pump, or a drum.

14. A system comprising:
    a first heat exchanger in a gas turbine system, the first heat exchanger having an outlet coupled to an inlet of a downstream element in a coupling arrangement that is characterized at least in part by an absence of sensor data indicative of a health status of the coupling arrangement; and
    a heat exchanger performance evaluation system comprising a processor, the processor configured to generate a command signal associated with modifying operation of at least one of the first heat exchanger or the downstream element by executing an evaluation procedure comprising:
       receiving sensor data from an inlet of the first heat exchanger and an outlet of the downstream element;
       receiving empirical data associated with one or both of the first heat exchanger and the downstream element;
       receiving predictive data associated with the one or both of the first heat exchanger and the downstream element; and
       generating the performance report by using at least the sensor data, the empirical data and the predictive data; and
       modifying, based at least in part on the command signal, operation of the first heat exchanger or the downstream element.

15. The system of claim 14, wherein generating the performance report comprises determining one or more performance parameters of the coupling arrangement using the sensor data obtained from the inlet of the first heat exchanger and the outlet of the downstream element.

16. The system of claim 15, wherein the sensor data obtained from the inlet of the first heat exchanger and the outlet of the downstream element is at least one of thermal performance data or fluid-flow performance data.

17. The system of claim 16, wherein the downstream element is one of a second heat exchanger, a valve, a pump, or a drum, and wherein the empirical data associated with the one or both of the first heat exchanger and the one of a second heat exchanger, a valve, a pump, or a drum comprises a membership function that is defined on the basis of an input-output thermal transfer relationship.

18. The system of claim 17, wherein generating the performance report further includes:
setting a limit value that is defined on the basis of a minimum heat duty and a maximum heat duty of the at least one of the first heat exchanger or the one of a second heat exchanger, a valve, a pump, or a drum; and
using the limit value in a Monte Carlo simulation procedure to define a plurality of classifiers.

19. The system of claim 18, wherein each of the plurality of classifiers is characterized by a unique combination of an operating condition of a fan that is a part of the first heat exchanger and an operating condition of the one of a second heat exchanger, a valve, a pump, or a drum.

20. The system of claim 19, wherein the evaluation procedure executed by the processor is a neural network procedure and wherein generating the performance report further includes:
generating a plurality of cluster models based at least in part on the plurality of classifiers; and
executing the neural network procedure using the plurality of cluster models, the sensor data, the empirical data, and the predictive data.

21. A method comprising:
receiving, by one or more processors, sensor data from an inlet of a first heat exchanger in a gas turbine system, and further receiving sensor data from an outlet of a downstream element coupled to the first heat exchanger;
receiving, by the one or more processors, empirical data associated with one or both of the first heat exchanger and the downstream element;
receiving, by the one or more processors, predictive data associated with one or both of the first heat exchanger and the downstream element;
generating, by the one or more processors, a command signal by executing an evaluation procedure using at least the sensor data, the empirical data, and the predictive data;
outputting the command signal to a controller;
generating by the controller, one or more control signals based at least in part on the command signal;
outputting at least one control signal to one or both of the first heat exchanger and the downstream element to modify an operating state of the one or both of the first heat exchanger and the downstream element; and
evaluating, by the one or more processors, the modified operating state of the one or both of the first heat exchanger and the downstream element to determine an extent of change in one or more parameters of the one or both of the first heat exchanger and the downstream element.

22. The method of claim 21, wherein outputting the at least one control signal to one or both of the first heat exchanger and the downstream element and evaluating, by the one or more processors, the modified operating state of the one or both of the first heat exchanger and the downstream element, is a part of a recursive procedure until the one or both of the first heat exchanger and the downstream element achieve a desired operating state.

23. The method of claim 21, wherein the downstream element is one of a heat dissipating element or a heat transfer element, and wherein executing the evaluation procedure comprises using the sensor data obtained from the inlet of the first heat exchanger and the outlet of the one of a heat dissipating element or a heat transfer element to indirectly determine one or more performance parameters at the outlet of the first heat exchanger.

24. The method of claim 23, wherein the evaluation procedure comprises executing a neural network procedure, wherein the sensor data obtained from the inlet of the first heat exchanger comprises at least one of thermal performance data or fluid-flow performance data, and wherein the fluid-flow performance data comprises at least one of fluid-flow pressure or fluid-flow rate.

25. The method of claim 24, wherein the downstream element is one of a second heat exchanger, a valve, a pump, or a drum, and wherein the empirical data associated with the one or both of the first heat exchanger and the one of a second heat exchanger, a valve, a pump, or a drum comprises a membership function that is defined on the basis of an input-output thermal transfer relationship.

26. The method of claim 25, further comprising:
setting a limit value that is defined based at least in part on a minimum heat duty and a maximum heat duty of the at least one of the first heat exchanger or the one of a second heat exchanger, a valve, a pump, or a drum; and
using the limit value in a Monte Carlo simulation procedure to define a plurality of classifiers.

27. The method of claim 26, wherein each of the plurality of classifiers is characterized by a unique combination of an operating condition of a fan that is a part of the first heat exchanger and an operating condition of the one of a second heat exchanger, a valve, a pump, or a drum.

28. The method of claim 27, further comprising:
generating a plurality of cluster models based at least in part on the plurality of classifiers.

29. The method of claim 28, wherein executing the evaluation procedure comprises using the plurality of cluster models, the sensor data, the empirical data, and the predictive data to generate a performance report.

* * * * *